(12) United States Patent
Geiger et al.

(10) Patent No.: US 9,479,329 B2
(45) Date of Patent: Oct. 25, 2016

(54) MOTOR VEHICLE CONTROL UNIT HAVING A CRYPTOGRAPHIC DEVICE

(75) Inventors: Stefan Geiger, Ingolstadt (DE); Ingo Ledendecker, Buxheim (DE); Carsten Schmal, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/006,785

(22) PCT Filed: Jan. 27, 2012

(86) PCT No.: PCT/EP2012/000362
§ 371 (c)(1),
(2), (4) Date: Sep. 23, 2013

(87) PCT Pub. No.: WO2012/126547
PCT Pub. Date: Sep. 27, 2012

(65) Prior Publication Data
US 2014/0016781 A1    Jan. 16, 2014

(30) Foreign Application Priority Data

Mar. 22, 2011    (DE) .................. 10 2011 014 688

(51) Int. Cl.
| | | |
|---|---|---|
| H04L 9/08 | (2006.01) | |
| H04L 9/14 | (2006.01) | |
| G06F 21/44 | (2013.01) | |

(52) U.S. Cl.
CPC ........... H04L 9/0816 (2013.01); G06F 21/445 (2013.01); H04L 9/0866 (2013.01); H04L 9/14 (2013.01); H04L 2209/84 (2013.01)

(58) Field of Classification Search
CPC ..... H04L 9/14; H04L 9/0816; G06F 21/445; G06F 21/44

USPC .................................................... 380/45, 277
See application file for complete search history.

(56) References Cited

U.S. PATENT DOCUMENTS 5,774,544 A * 6/1998 Lee et al. ................... 713/189
6,185,307 B1 * 2/2001 Johnson, Jr. ............... 380/270
(Continued)

FOREIGN PATENT DOCUMENTS

| CN | 1549959 | 11/2004 |
|---|---|---|
| DE | 10008973 | 9/2001 |

(Continued)

OTHER PUBLICATIONS

Secure and authentic communication on existing in-vehicle networks, Groll et al, Intelligent Vehicles Symposium, IEEE, 2009.*
(Continued)

*Primary Examiner* — Luu Pham
*Assistant Examiner* — Jahangir Kabir
(74) *Attorney, Agent, or Firm* — Staas & Halsey LLP

(57) ABSTRACT

It should not be possible for control units for motor vehicles to be exchanged between individual motor vehicles by unauthorized persons. For a motor vehicle it should, therefore, be rendered possible for individual functionalities of a control unit to be unblocked only for a specific motor vehicle. For this purpose, a first cryptographic key and a second cryptographic key are stored in a control unit. A cryptographic device is designed to encrypt a first message initially by one of the cryptographic keys, subsequently to encrypt a result of the encryption by the other cryptographic key and, finally, to provide a result of the second encryption as third cryptographic key for an encryption and/or decryption of a further message. A method configures a control unit in a motor vehicle.

6 Claims, 1 Drawing Sheet

(56) References Cited

U.S. PATENT DOCUMENTS

| | | | | |
|---|---|---|---|---|
| 7,197,637 | B2* | 3/2007 | Schmidt | B60R 25/24 |
| | | | | 713/156 |
| 9,064,101 | B2* | 6/2015 | Kleve | H04L 9/3215 |
| 2004/0003231 | A1 | 1/2004 | Levenson et al. | |
| 2004/0187011 | A1* | 9/2004 | Lee | G06F 21/10 |
| | | | | 713/193 |
| 2004/0260938 | A1* | 12/2004 | Weber | H04L 9/0894 |
| | | | | 726/34 |
| 2009/0022317 | A1* | 1/2009 | Akima | B60R 25/04 |
| | | | | 380/277 |
| 2011/0064224 | A1* | 3/2011 | Rebuli | B60R 25/00 |
| | | | | 380/277 |
| 2012/0095920 | A1* | 4/2012 | McQuade | H04L 9/3215 |
| | | | | 705/50 |
| 2013/0151647 | A1* | 6/2013 | Tatsumi | G06F 8/65 |
| | | | | 709/213 |

FOREIGN PATENT DOCUMENTS

| | | |
|---|---|---|
| DE | 10238094 | 3/2004 |
| DE | 102004052787 | 5/2006 |
| DE | 102006006109 | 8/2007 |
| DE | 102006015212 | 10/2007 |
| DE | 102006040228 | 3/2008 |
| DE | 102008008108 | 8/2009 |
| DE | 102009025585 | 12/2010 |
| DE | 102011014688.1 | 3/2011 |
| EP | 1139064 | 10/2001 |
| WO | 03/019337 | 3/2003 |
| WO | 2005/116834 | 12/2005 |
| WO | 2012/000362 | 1/2012 |

OTHER PUBLICATIONS

Designing multicore ECU architecture in vehicle networks using AUTOSAR, Senthilkumar et al, 2011 Third International Conference on Advanced Computing, IEEE 2011.*

English Language International Search Report for PCT/EP2012/000362, mailed on Apr. 18, 2012, 3 pages.

Chinese Office Action issued May 7, 2015 in Chinese Patent Application No. 201280014220.9.

Chinese Office Action issued Oct. 27, 2015 in Chinese Patent Application No. 201280014220.9.

Chinese Office Action dated Feb. 2, 2016 in Chinese Patent Application No. 201280014220.9.

* cited by examiner

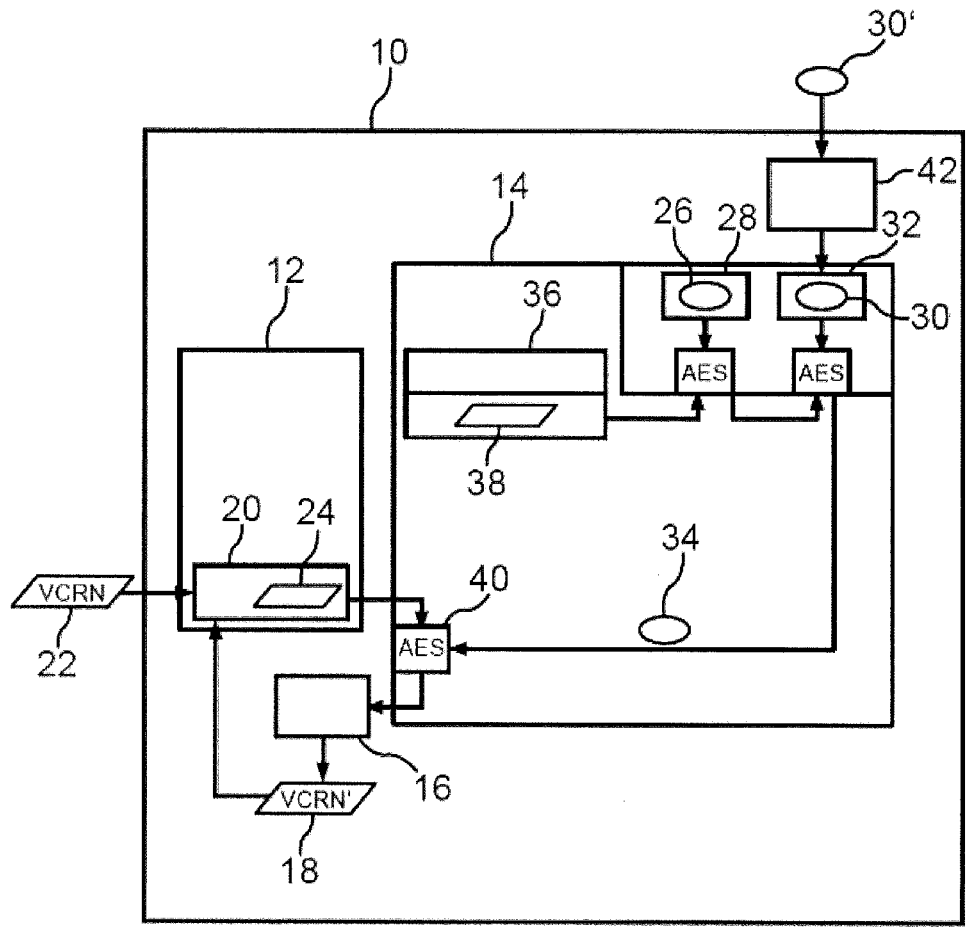
| | LEGEND | | |
|---|---|---|---|
| 10 | control unit | 28 | memory |
| 12 | control device | 30 | vehicle-associated key |
| 14 | encryption device | 30' | vehicle-associated key |
| 16 | compressing device | 32 | memory |
| 18 | output value | 34 | combined key |
| 20 | unblocking component | 36 | configuration file |
| 22 | unblocking code | 38 | character sequence |
| 24 | character sequence | 40 | encryption component |
| 26 | control-unit-associated key | 42 | receiving device |

MOTOR VEHICLE CONTROL UNIT HAVING A CRYPTOGRAPHIC DEVICE

CROSS REFERENCE TO RELATED APPLICATIONS

This application is based on and hereby claims priority to International Application No. PCT/EP2012/000362 filed on Jan. 27, 2012 and German Application No. 10 2011 014 688.1 filed on Mar. 22, 2011, the contents of which are hereby incorporated by reference.

BACKGROUND

The invention relates to a control unit for a motor vehicle, a cryptographic device for encrypting and/or decrypting a message being provided in the control unit. The a method for configuring the control unit for use in the motor vehicle.

In a motor vehicle, functionalities such as, e.g., an engine controller, navigation assistance or telephony are provided by individual control units. It should not be possible for the control units to be exchanged between individual motor vehicles by unauthorized persons. Thus, on the one hand, it should not be possible for any stolen control units to be used in other motor vehicles. On the other hand, the installation of a used control unit in a motor vehicle by an unskilled person can endanger the safety of a user of the motor vehicle.

From DE 10 2006 040 228 A1, an identification system for control units in a motor vehicle is known by which it is possible to check whether a control unit has been installed in the motor vehicle by an authorized person. For this purpose, an identification code of the motor vehicle is encrypted by a (private) cryptographic key of an asymmetric encryption method and the encrypted identification code is stored in the control unit. The encrypted identification code can be read out again later from the control unit by a test unit, decrypted on the basis of a complementary cryptographic key (public key) and then checked.

From WO 2005/116834 A1, a method for authenticating a control unit in a vehicle is known. According to this, the control unit sends an authentication request to an authentication device of the vehicle before it provides a functionality. The authentication request is encrypted by the authentication device by a cryptographic key and subsequently sent back to the control unit. In the control unit, it is checked by the encryption result sent back whether the control unit is authenticated for the vehicle.

In EP 1 139 064 A1, a navigation system is described in which it is checked whether a user of data such as, for example, road map data, is authorized to use these data. To unblock the usage rights for a file, it is provided that the user initially inputs a first and second encrypted code into the navigation system. By an equipment identifier of the navigation system and the first encrypted code, a key is first calculated. The files are also encrypted by the key so that the files can be read by the key.

US 2004/0003231 A1 shows a control unit for a motor vehicle. The control unit authenticates itself to the motor vehicle by a challenge-response method and the motor vehicle authenticates itself to the control unit by a challenge-response method. In this method, e.g. a private key and a certificate with the associated public key is allocated to the control unit. The vehicle checks the certificate and sends a challenge to the control unit. The control unit encrypts the challenge using the private key and sends it back as a response. The vehicle can decrypt and check the response using the public key. The same method can also be performed by the control unit. The control unit is tied to the vehicle due to the mutual authentication.

DE 10 2009 025 585 A1 shows a method for unblocking a vehicle function in a control unit on the basis of a function activation code. The unblocking code is formed from the chassis number and the serial number of the control unit and signed with a private key. The control unit checks the signature, the chassis number and the serial number and activates the vehicle function correspondingly.

In DE 10 2008 008 108 A1, a function is unblocked by an unblocking code, the unblocking code being encrypted by a key allocated to the vehicle and decrypted by a mobile telephone allocated to a user. The unblocking code is thus tied to the vehicle and to the user.

WO 03/019 337 A2 shows a method in which software for a vehicle control unit is executed only when there is an unblocking code certificate and a signature has been checked by a stored public key. In addition, the unblocking code contains the chassis number and the control unit number in order to restrict the utilization of the software to the combination of chassis number and control unit number.

SUMMARY

One potential object is to provide a possibility so that a particular control unit or a particular functionality of the latter can only be used in a particular motor vehicle.

The inventors propose a control unit of a motor vehicle, in which control unit a first cryptographic key and a second cryptographic key are stored. Additionally, a cryptographic device is provided which is designed to encrypt a first message initially by one of the cryptographic keys, subsequently to encrypt a result of the encryption by the other cryptographic key and, finally, to provide a result of the second encryption as third cryptographic key for an encryption and/or decryption of a further message.

Cryptographic keys are already known as such from digital cryptographic methods. In conjunction with the inventors' proposals, the keys are preferably in each case those for a symmetric encryption method. The input for an encryption or decryption algorithm is called a message. It can be formed of a character sequence (letters or numbers), an individual character or generally of a bit sequence of arbitrary predetermined length.

An encryption of the further message by the third key always produces an encryption result which depends both on the first and on the second key. As a consequence, it is possible to enforce in the control unit, by specifying a corresponding first and a corresponding second key, that both an identification feature of the control unit itself and also of the motor vehicle in which the control unit may only be operated, is impressed on the encrypted further message. By the third cryptographic key, the cryptographic unit is then able to encrypt the further message in dependence on both the first and the second predetermined key by only a single encryption process. In comparison with specifying only a single key, there is thus no resultant loss with respect to the expenditure of time and calculation. This correspondingly also applies to a decryption.

The first cryptographic key is a key generated individually for the control unit. In the case of an exchange of an authenticated control unit by another, not authenticated control unit, this newly inserted unit is then not capable of deciphering encrypted messages intended for the authenticated unit in a motor vehicle.

The second cryptographic key is a motor-vehicle-specific key. Correspondingly, the motor vehicle has at least one of the proposed control units in which the stored second cryptographic key is a key generated individually for this motor vehicle. The respective control unit can then only process the messages encrypted for this motor vehicle, or only generate such messages, respectively. A control unit stolen from the motor vehicle can thus advantageously not be used in any other motor vehicle.

In order to be able to specify the second cryptographic key during the installation of the control unit in a particular motor vehicle in a simple manner, the control unit preferably has a device for receiving a cryptographic key from outside the control unit and for specifying the received key as the second cryptographic key. This results in the advantage that a used control unit can also be used again in a motor vehicle in that the second key is correspondingly adapted in the control unit. By new double encryption of the first message, the control unit is then able to newly generate the third key for encrypting and decrypting the further message, respectively.

The first message is preferably stored in the control unit. It is then sufficient to store the new vehicle-specific key and the control unit is able independently to generate the further (third) key.

By the method proposed by the inventors, at least one proposed control unit can be configured correspondingly for use in a motor vehicle. According to the method, a cryptographic key is generated for each control unit, a different individual key being generated for each control unit. A further cryptographic key is generated which is allocated to the motor vehicle as motor-vehicle-specific key. In each control unit, the respective individual key is stored as first key and the motor-vehicle-specific key is stored as second key. By the method, it is advantageously ensured that each control unit has a unique combination of a unit-associated key and a vehicle-specific key.

According to a further aspect of the proposal, the control unit has an unlocking device for unblocking a functionality of the control unit in dependence on an unblocking code which can be predetermined from outside the control unit. The unblocking device is designed to encrypt a message, standing for the functionality to be unlocked, by the cryptographic device by the third cryptographic key, to compare a result of the encryption with the unblocking code and to unlock the functionality in dependence on the comparison. The unlocking code is preferably formed in the same manner so that an encryption result identical with the unblocking code is produced when the control unit is used in the correct vehicle. This development of the control unit has the advantage that an unblocking code can be used which provides for unblocking for precisely one particular control unit in precisely one particular motor vehicle.

Correspondingly, the proposed method is advantageously developed if for each control unit, a copy of the individual key and a copy of the motor-vehicle-specific key are stored outside the control units. An unblocking code is then generated for unlocking a functionality of one of the control units on the basis of the corresponding individual key stored outside the control unit and of the motor-vehicle-specific key stored outside the control unit and is conveyed to the control unit to be unblocked. An unblocking code needed can be generated at any time for a particular control unit in a particular motor vehicle by storing the unit-associated keys and the motor-vehicle-specific key.

The keys are stored preferably in a central database outside the vehicle. The first message needed for generating the third key is also stored as a copy preferably likewise outside the control units.

If the first and the second key are those for an asymmetric encryption method, a key, complementary thereto, is stored in each case instead of the copy of the key.

The control unit can be developed further by a compressing device for generating a shortened encrypted message from a message encrypted by the encryptographic device. This results in the advantage that very short character sequences can be generated which, nevertheless, are suitable for unlocking the control unit for use in a particular motor vehicle. The shortened encrypted message in this arrangement can be generated preferably by a CRC method or a hash method.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The FIGURE shows a diagrammatic representation of a proposed control unit.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The FIGURE shows a control unit 10 which is installed in a passenger vehicle (not shown in greater detail). In conjunction with the example forming the basis of the FIGURE, it is assumed that the control unit is a navigation unit of the passenger vehicle. In general, however, it can be a control unit by which any other functionality is provided instead of the navigation assistance.

A route calculation necessary for the navigation assistance and a generation of driving instructions via a digital display (not shown) of the navigation unit is controlled by a control device 12. The control device 12 is coupled to an encryption device 14 of the control unit 10. An output of the encryption device 14 can be transmitted to a compressing device 16. An output value 18 of the compressing device 16 can be transmitted to the control device 12.

The control device 12, the encryption device 14 and the compressing device 16 can be in each case a circuit arrangement of the control unit 10 or a program which is executed by a processor of the control unit 10.

The control device 12 provides the "navigation assistance" functionality only if it has previously been detected that the passenger vehicle is the vehicle for which this functionality of the control unit 10 has also been authenticated.

For this unblocking of the control unit 10, the control device 12 has an unblocking component 20. Via a communication bus (not shown) of the passenger vehicle (a diagnostic bus in this case), an unblocking code 22 has been transmitted to the control unit 10, for example during an installation of the control unit 10 in the motor vehicle. Within the control unit 10, the unblocking code 22 has been transmitted to the unblocking component 20. The unblocking code 22 contains, apart from other data, a vehicle identification or vehicle component reference number VCRN. In the example, it may be a 4-byte-long code by which it is specified which quite particular control unit (identified by its serial number) is authenticated for the passenger vehicle (identified by its chassis number) in conjunction with the "navigation assistance" functionality.

For example, it can also be provided that the control unit 10 is not unblocked during the installation, but only later by a user of the motor vehicle himself. For this purpose, it can be provided that the unblocking code is transmitted via an Internet connection from a database to the motor vehicle and is conveyed to the control unit 10. Thus, the user can also be enabled, e.g., to unblock further functionalities of his control unit retrospectively.

For checking the authentication of the control unit 10, the unblocking component 20 sends a character sequence 24, which stands for the "navigation assistance" functionality, to the encryption device 14. The message can include, for example, a number or a text. The character sequence 24 is stored as a constant data item in the unblocking device 20.

The character sequence 24 is encrypted by the encryption device 14. The encryption result is a 16-byte-long digital value in the example shown. This value is transmitted by the encryption device 14 to the compressing device 16. The compressing device 16 forms from the 16-byte-long value the 4-byte-long output value 18 which is transmitted to the unblocking component 20 as a local VCRN, i.e. a VCRN which has been generated within the control unit 10. In the FIGURE, the local VCRN is correspondingly designated as VCRN'.

The unblocking device 20 compares the VCRN contained in the unblocking code 22 and the local VCRN (VCRN'). If the two values are identical, the control device 14 is activated, i.e. the control unit 10 is then unblocked. Otherwise, the control device 14 is not activated so that the control unit 10 does not provide the "navigation assistance" functionality.

In the text which follows, the encryption of the character sequence 24 and the subsequent compression is explained again in greater detail.

By encrypting the character sequence 24, the encryption device has generated an encryption result which, with the given character sequence 24, is unique for the combination of the control unit 10 to be unblocked and the passenger vehicle in which the control unit 10 is installed. For this purpose, a control-unit-associated key 26 is stored in a memory 28 in the encryption device 14 and a vehicle-associated key 30 is stored in a memory 32 in the encryption device 14.

The two keys are cryptographic keys for a symmetric encryption method. Key 26 has been generated individually for the control unit 10 during the production of the control unit 10 and stored in memory 28. Other control units of the same series but having a different serial number have different keys in their corresponding memories. Key 30 has been generated individually for the passenger vehicle in the sense that the passenger vehicle has a unique chassis number and key 30 has been generated for this chassis number.

For the encryption of the character sequence 24, a third, combined key 34 having a length of 16 byte in this case is used by the encryption device 14. The key 34 has been generated by the encryption device 14 after a key 30 has been stored in memory 32. For this purpose, a character sequence 38 is stored in a configuration file 36 which is stored in the encryption device 14. The character sequence 38 can be, for example, a value or of a text. The character sequence 38 has been encrypted with the key 26 by a symmetric encryption method and the result of this encryption has been encrypted with the key 30. The encryption method is in the example a method according to the Advanced Encryption Standard (AES). Key 34 is provided by the encryption device 14 for an encryption of messages such as the character sequence 24 by a further encryption (in this case also according to the AES) in an encryption component 40.

The key 34 being formed from the control-unit-associated key 26 and the vehicle-associated key 30, an encryption with the encryption component 40 always produces an encryption result which is marked both by the identity of the control unit 10 and by the identity of the passenger vehicle.

The compressing device 16 compresses the encryption result of the encryption device 40 by a CRC (Cyclic redundancy check) process.

The VCRN contained in the unblocking code 22 has been formed in the same manner from a copy of the character sequence 24 as the VCRN' from the character sequence 24. For generating the unblocking code 22, a copy of the keys 26 and 30 has respectively been read out of a database by the serial number of the control unit 10 and the chassis number of the passenger vehicle. The database is operated by the manufacturer of the passenger vehicle. The character sequence 38 is also known to the manufacturer.

By the copies of the keys, a character sequence which is identical with the character sequence 24 has been encrypted and compressed in the same manner as is done in the control unit 10 by the encryption device 14 and the compressing device 16. The manufacturer has been able to generate a key necessary for the encryption, identical with the key 34, from the copies of the keys 26 and 30 from the database and the known character sequence 38. The compressed encryption result has been inserted as VCRN in the unblocking code 22. The compressed encryption result is still control-unit- and vehicle-specific to such a high degree that it is very improbable that a VCRN formed from a compressed encryption result is suitable for unblocking the control unit 10 in another passenger vehicle.

In order to be able to uninstall the control unit 10 and use it in another passenger vehicle, the control unit 10 has a receiving device 42 by which a vehicle-associated key 30' of the passenger vehicle can be received and written into the memory 32.

A receiving device such as the receiving device 42 can also be provided for writing into memory 28. The control-unit-associated key 26 can then be specified at a later time, e.g. by the manufacturer of the motor vehicle instead of the manufacturer of the control unit 10.

With each cross exchange of the control unit 10 between two passenger vehicles, a new VCRN is additionally generated for unblocking the control unit 10 for the respective passenger vehicles by the manufacturer of the passenger vehicle and provided to the user of the passenger vehicle for unblocking the control unit 10.

In the case of a control unit such as the control unit 10, it can also be provided to provide not only the one character sequence 24 but a plurality of different character sequences. A selective unblocking of different functionalities of the control unit via different unblocking codes is then possible.

However, the character sequence 24 can also be a value independent of the functionality to be unblocked. It is then possible to generate unblocking codes for different control units in a motor vehicle by one and the same character sequence.

The example shows how it is possible to check with a control unit whether the control unit is licensed to the passenger vehicle in which it is installed.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method to selectively unblock a functionality of a controller in a vehicle to prevent an unauthorized use of the controller in an unauthorized installation of the controller in an unauthorized vehicle, and to allow the functionality of the controller in an authorized vehicle, the method comprising:

storing in a memory of the vehicle, a controller key generated specifically for the controller of the vehicle, preventing an unauthenticated controller from decrypting encrypted messages intended for the controller in the vehicle;

storing in the memory, a vehicle key generated specifically for the vehicle, permitting the controller to only process messages encrypted for the vehicle, wherein the controller has a unique combination of the controller key and the vehicle key;

storing in the memory, a configuration file including a first character sequence;

encrypting with the controller key, the first character sequence, to produce a result, the first character sequence being encrypted in an encryption device;

encrypting with the vehicle key, the result, to produce a combined key, the result being encrypted in the encryption device;

receiving by the encryption device, an unblocking code including a vehicle component reference number and a second character sequence;

encrypting with the combined key, the second character sequence, the second character sequence being encrypted in the encryption device; and unblocking the functionality of the controller of the vehicle if the result of the encrypting the second character sequence is identical to the vehicle component reference number, and blocking the functionality of the controller of the vehicle if the result of the encrypting the second character sequence is different from the vehicle component reference number.

2. The method of claim 1, wherein encrypting with the combined key further comprises:

compressing the result of the encrypting the second character sequence by a cyclic redundancy check process.

3. The method of claim 1, wherein the unblocking code is generated by a manufacturer of the vehicle and transmitted to the encryption device.

4. A vehicle configured to selectively unblock a functionality of a controller in the vehicle to prevent an unauthorized use of the controller in an unauthorized installation of the controller in an unauthorized vehicle, and to allow the functionality of the controller in an authorized vehicle, the vehicle comprising:

a memory storing a set of instructions; and a computer processor configured to execute the set of instructions to:

store a controller key generated specifically for a controller of the vehicle, preventing an unauthenticated controller from decrypting encrypted messages intended for the controller in the vehicle;

store a vehicle key generated specifically for the vehicle, permitting the controller to only process messages encrypted for the vehicle, and the controller has a unique combination of the controller key and the vehicle key;

store a configuration file including a first character sequence; and a hardware controller to:

encrypt with the controller key, the first character sequence, to produce a result, the first character sequence being encrypted in an encryption device;

encrypt with the vehicle key, the result, to produce a combined key, the result being encrypted in the encryption device;

receive by the encryption device, an unblocking code including a vehicle component reference number and a second character sequence;

encrypt with the combined key, the second character sequence, the second character sequence being encrypted in the encryption device; and unblock the functionality of the controller of the vehicle if the result of the encrypting the second character sequence is identical to the vehicle component reference number, and block the functionality of the controller of the vehicle if the result of the encrypting the second character sequence is different from the vehicle component reference number.

5. The vehicle of claim 4, wherein the encryption device is included in the hardware controller.

6. The vehicle of claim 5, wherein the memory is included in the encryption device.

* * * * *